(12) United States Patent
Negroni et al.

(10) Patent No.: US 9,102,019 B2
(45) Date of Patent: Aug. 11, 2015

(54) PROCESS FOR JOINING AIRCRAFT STRUCTURAL COMPONENTS

(71) Applicant: EMBRAER S.A., São José dos Campos-SP (BR)

(72) Inventors: Daniella Yada Negroni, São José dos Campos (BR); Luis Gonzaga Trabasso, São José dos Campos (BR)

(73) Assignees: EMBRAER S.A., São José dos Campos (BR); ITA-INSTITUTO TECNOLÓGICO DE AERONÁUTICA, São José dos Campos (BR)

( * ) Notice: Subject to any disclaimer, the term of this patent is extended or adjusted under 35 U.S.C. 154(b) by 127 days.

(21) Appl. No.: 13/725,855

(22) Filed: Dec. 21, 2012

(65) Prior Publication Data

US 2014/0173879 A1  Jun. 26, 2014

(51) Int. Cl.
*B21J 15/02* (2006.01)
*B23P 19/04* (2006.01)
*B21J 15/14* (2006.01)
*B23B 35/00* (2006.01)
*B23P 19/12* (2006.01)

(52) U.S. Cl.
CPC ............... *B23P 19/04* (2013.01); *B21J 15/142* (2013.01); *B23B 35/00* (2013.01); *B23B 2215/04* (2013.01); *B23P 19/12* (2013.01); *B23P 2700/01* (2013.01); *Y10T 29/49947* (2015.01)

(58) Field of Classification Search
CPC ...... B64F 5/0009; B21J 15/142; B65D 65/02; B23P 65/02; B23P 19/12; B23P 2700/01

USPC .................... 29/897.2, 524.1, 525.01, 525.06
See application file for complete search history.

(56) References Cited

U.S. PATENT DOCUMENTS

| | | | |
|---|---|---|---|
| 5,560,102 A | 10/1996 | Micale et al. | |
| 6,073,326 A | 6/2000 | Banks et al. | |
| 6,796,014 B2 * | 9/2004 | Sarh ........................... | 29/407.09 |
| 7,770,477 B2 * | 8/2010 | Hazlehurst et al. .......... | 73/865.8 |
| 8,209,865 B2 * | 7/2012 | Kelley et al. ................. | 29/897.2 |
| 2006/0010689 A1 * | 1/2006 | Salour et al. ................ | 29/897.32 |
| 2010/0308171 A1 * | 12/2010 | Kelley et al. ................. | 244/132 |

FOREIGN PATENT DOCUMENTS

| | | |
|---|---|---|
| EP | 0 593 127 | 4/1994 |
| EP | 0 917 920 | 5/1999 |

* cited by examiner

*Primary Examiner* — Jermie Cozart
(74) *Attorney, Agent, or Firm* — Noxon & Vanderhye P.C.

(57) ABSTRACT

A process for joining parts together is provided by positioning and temporarily clamping parts to be joined together. A number (n) of pilot holes may then be drilled through the temporarily clamped parts (e.g., by means of Cleco fasteners), wherein the number (n) of pilot holes is less than a total number (N) of holes required to be drilled to allow the parts to be joined together by permanent fasteners and to receive temporary fasteners therein. A remaining number (η) of holes to achieve the total number (N) of holes required for the parts to be joined together by permanent fasteners may thereafter be drilled so that permanent fasteners may be installed both, by automated system, in the number (n) of pilot holes and the remaining number (η) of holes that have been drilled to thereby permanently join the parts together.

12 Claims, 2 Drawing Sheets

PROCESS FOR JOINING AIRCRAFT STRUCTURAL COMPONENTS

FIELD

The embodiments disclosed herein relate generally to methods for joining aircraft structural components, especially the splicing of aircraft fuselage panels and segments such as connecting fuselage skin to underlying fuselage support (e.g., fuselage orbital splices and longitudinal stringers or wing ribs).

BACKGROUND

Conventionally, the structural assembly of aircraft fuselage parts (e.g., fuselage sections to be spliced together or for joining wing ribs to the wing skins) includes the use of temporary fasteners (e.g., "Cleco fasteners") for providing a temporary clamp force onto the parts package to be joined. The thus clamped parts of the package are then drilled by semi-automatic drilling systems or assemblies known in the art, for example by the systems and techniques disclosed in U.S. Pat. Nos. 5,560,102 and 6,073,326, the entire contents of each being expressly incorporated hereinto by reference). The temporarily joined parts of the package are thereafter disassembled for the purpose of deburring and to remove chips resulting from the drilling step that may have become lodged between the parts of the package being joined. In the case of fuselage segment assembly, the orbital splices and longitudinal stringer splices are typically installed in separated stages (steps).

As one illustrative example to understand the background of the embodiments described herein, orbital splices and longitudinal stringers are junction elements which are used to provide the junction of two aircraft fuselage segments. These two structural elements (i.e., the orbital splices and the longitudinal stringers) are joined to fuselage skin elements in the region of the junction of the two segments of the fuselage and thus become part of the fuselage structure. Since the step of joining the orbital splices to the fuselage skin involves drilling through the adjacent structural elements, there may be an accumulation of burrs between the parts (e.g., between the fuselage skin and the orbital splices). The same problem may occur during the process of joining the longitudinal stringers to the fuselage skin.

Figures 1A, 1B:
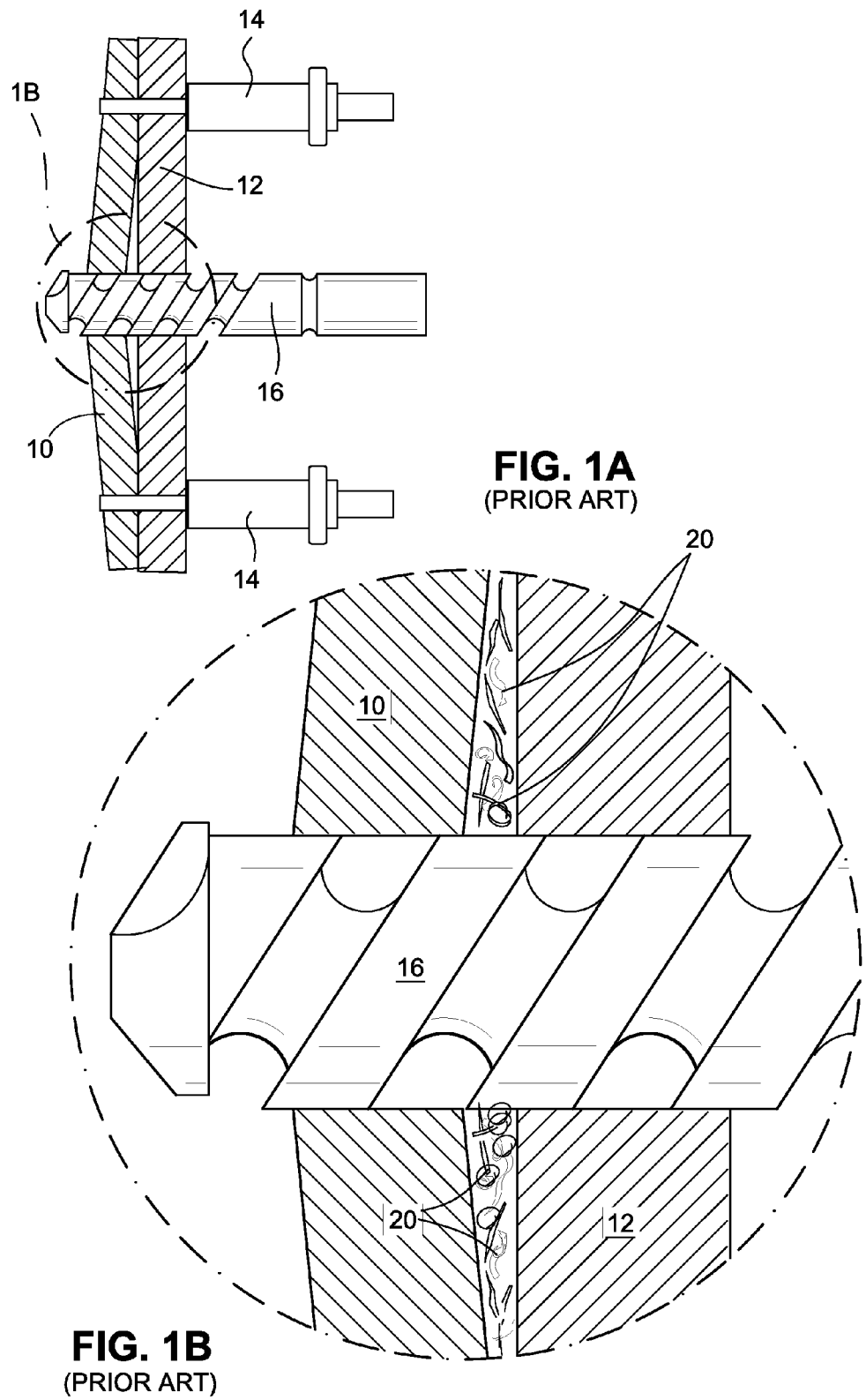

Accompanying FIGS. 1A and 1B depict schematically the drilling process to join an aircraft skin 10 to an underlying structural support 12 of an aircraft fuselage. As is seen, the skin 10 and support 12 are temporarily joined to one another by means of Cleco fasteners 14 positioned in a hole formed in the parts to be occupied later by a permanent rivet. When drilling, e.g., with bit 16, there is the possibility that metallic chips (shown schematically by reference numeral 20 in FIG. 1B) may become lodged between the skin 10 and the support 12, e.g., due to the inadequate clamping forces of the Cleco fasteners 14 which can allow the skin 10 to flex outwardly away from the support 12. These chips 20 must therefore be removed before final assembly that is effected thereby increasing the assembly time and costs.

It would therefore be especially desirable if an assembly technique was provided which addressed the problems noted previously with regard to the conventional techniques to assemble aircraft structural components. It is therefore towards providing solutions to such problems that the embodiments disclosed herein are directed.

SUMMARY

The disclosed embodiments herein are directed toward a process for joining parts together which is more economical and efficient as compared to conventional techniques. According to some embodiments, a process for joining parts together is provided by positioning and temporarily clamping parts to be joined together. A number (n) of pilot holes may then be drilled through the temporarily clamped parts (e.g., the parts may be temporarily clamped by means of Cleco fasteners), wherein the number (n) of pilot holes is less than a total number (N) of holes required to be drilled to allow the parts to be joined together by permanent fasteners. Temporary fasteners may then be installed in the number (n) of pilot holes that are drilled. A remaining number ($\eta$) of holes that are required in addition to the number (n) of pilot holes to achieve the total number (N) of holes required for the parts to be joined together by permanent fasteners may thereafter be drilled so that permanent fasteners may be installed both in the number (n) of pilot holes and the remaining number ($\eta$) of holes that have been drilled to thereby permanently join the parts together.

According to some embodiments, the temporary fasteners installed in the number (n) of pilot holes may be removed by drilling and thereafter installing permanent fasteners therein. The temporary fastners can be, for example, tack rivets.

In some embodiments, the steps of drilling the remaining number ($\eta$) of holes and the removal of the temporary fasteners in the number (n) of pilot holes can be achieved by an automated robotic drilling and installation assembly. The installation of the permanent fasteners may likewise be achieved by such an automated system.

According to some embodiments, the temporarily clamped parts may be removed from one another and then cleaned (e.g., to remove burrs and/or metal filings due to the drilling operation). Thereafter, the cleaned parts may be re-positioned to align the pilot holes to thereby allow the drilling of the remaining number of holes as described previously.

In some embodiments, one of the parts to be joined includes fuselage support structure comprised of orbital splices and longitudinal stringers and another of the parts is an aircraft skin to be joined thereto. According to such embodiments, the orbital splices and longitudinal stringers may first be positioned and temporarily clamped onto the fuselage skin. Once the number (n) of pilot holes has been drilled, the temporarily clamped orbital splices and longitudinal stringers may be separated from the aircraft skin for cleaning and deburring of the parts. The fuselage support structure, which comprises the orbital splices and longitudinal stringers, may then be positioned onto the fuselage skin so as to align the pilot holes with one another in the same stage (step).

These and other aspects and advantages of the present invention will become more clear after careful consideration is given to the following detailed description of the preferred exemplary embodiments thereof.

BRIEF DESCRIPTION OF ACCOMPANYING DRAWINGS

Figure 2:
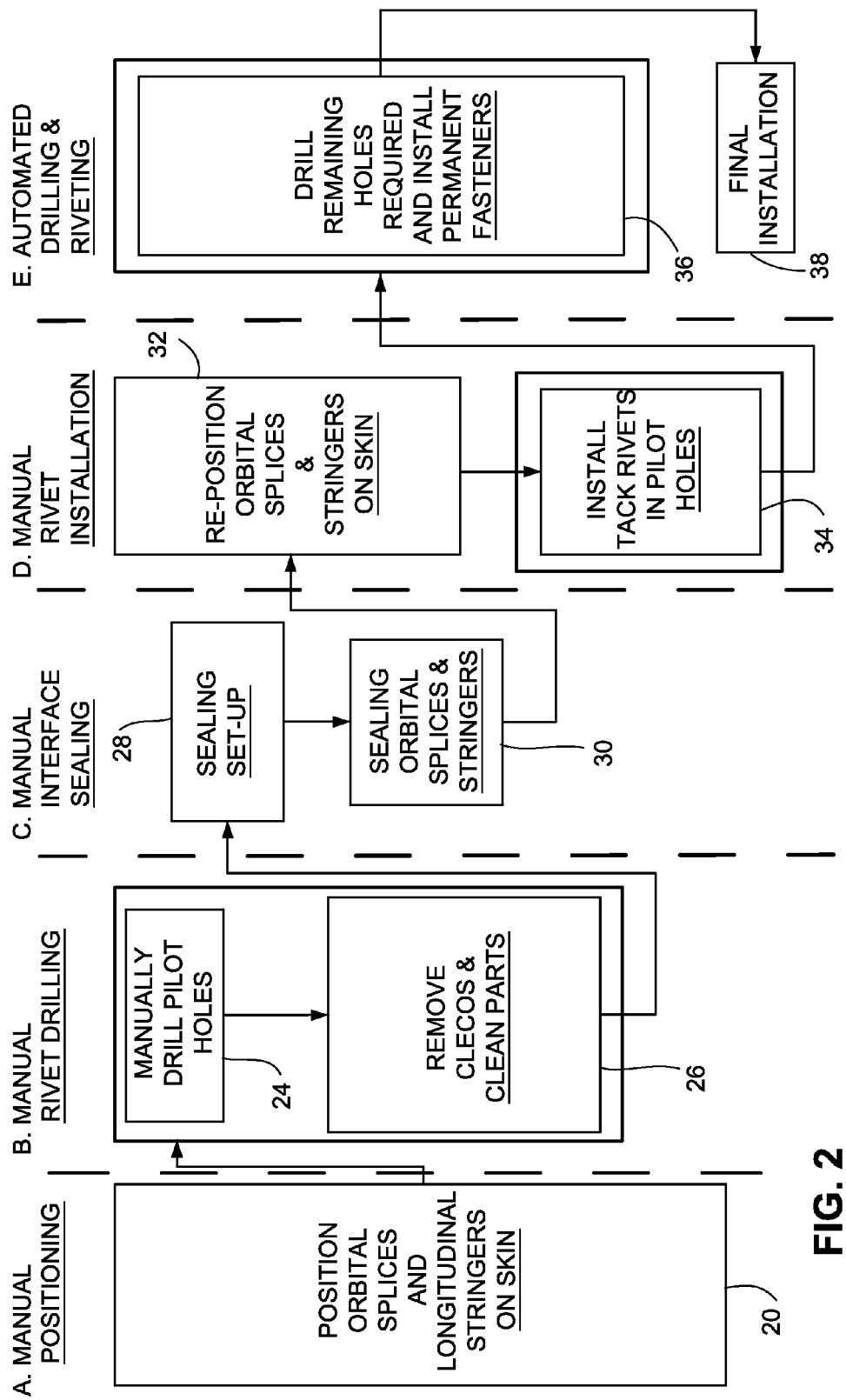

The disclosed embodiments of the present invention will be better and more completely understood by referring to the following detailed description of exemplary non-limiting illustrative embodiments in conjunction with the drawings of which:

FIGS. 1A and 1B schematically depict a conventional drilling step during the assembly of an aircraft skin to a supporting structure; and FIG. 2 is a schematic block diagram of the steps employed in a technique to join parts to one another in accordance with an embodiment of the invention disclosed herein.

DETAILED DESCRIPTION

One exemplary embodiment of the structural assembly process is the orbital junction of fuselage segments, that is the joining of orbital splices and longitudinal stringers to fuselage skin in the junction region of the abutted fuselage segments. According to this embodiment, the installation of the orbital splices and longitudinal stringers are performed simultaneously in order to increase the stiffness of the structure (that is, to increase the force to join the parts of the package) and to avoid chips and burrs being lodged between the parts that may result from the drilling step.

A schematic flow chart of an exemplary embodiment for the structural assembly of fuselage segments is shown in accompanying FIG. 2. As shown, the assembly process generally includes in step 20 the manual positioning of orbital splices and longitudinal stringers on the fuselage skin in the junction region of two fuselage segments. The manually positioned orbital splices and longitudinal stringers are temporarily joined to the fuselage skin by use of temporary fasteners (Clecos) to provide clamp force onto the parts of the package (e.g., the fuselage skin, orbital splices and longitudinal stringers).

While the parts are joined together by the clamping forces of the temporary fasteners (Clecos), a selected number of pilot holes are drilled manually in step 24 through the adjacent temporarily clamped parts. In this regard, the selected number of pilot holes drilled will be a percentage of the total number of holes needed to join the parts together by the insertion of permanent fasteners, such as permanent rivets and/or pins. The number of pilot holes will vary depending on the parts package to be joined and the particular size of such parts package. In general, however, it may be between about 5% to about 50% of the total number of holes needed.

Once the number of pilot holes has been drilled, the temporary fasteners (Clecos) are removed in step 26 to allow removal the orbital splices and longitudinal stringers. The parts package is then capable of being cleaned to remove any burrs and/or chips that may be present as a result of the drilling in step 24. Since the drilled pilot holes are a percentage of the total number of holes needed to join the parts together, the time necessary to clean the parts is shorter.

Once the parts have been cleaned, they are prepared for sealing (sealing set up) in step 28. Thereafter, the orbital splices and longitudinal stringers are sealed in step 30 according to techniques well known in the art.

The orbital splices and the longitudinal stringers are then re-positioned simultaneously on the fuselage skin in step 32 at the junction region between two fuselage segments so that the respective pilot holes in the skin, orbital splices and longitudinal stringers are aligned. The simultaneous re-positioning of the orbital splices and the longitudinal stringers on the fuselage skin increases the stiffness of the structure (that is, increases the force to join the parts of the package). Temporary (tack) rivets may then be installed in the aligned pilot holes according to step 34. In this way, increased structural integrity and rigidity between the skin on the one hand and the underlying supports (i.e., the orbital splices and longitudinal stringers) on the other hand are established in order to totally avoid chips and burrs being lodged between the parts that may result from the drilling that occurs in the next step.

The thus joined parts may then be subjected to automated drilling and riveting in step 36. Specifically, in this step 36, the remaining number of needed holes will be drilled. That is, the number ($\eta$) of remaining holes needed to be drilled in step 36 will equal the total number (N) of holes required to join the parts together with permanent fasteners minus the number (n) of pilot holes previously drilled and occupied by temporary (tack) rivets per step 34 ($\eta = N - n$).

The number ($\eta$) of remaining holes needed will preferably be drilled by an automated robotics drilling and assembly system as known in the art. Such an automated drilling and assembly system will also remove by drilling the temporary (tack) rivets installed previously in step 34 so that permanent fasteners (e.g., permanent rivets and/or pins) may be installed in the all of the holes (i.e., the total number (N) of holes including the number ($\eta$) of holes drilled according to step 36 and the number (n) of pilot holes having temporary (tack) rivets installed therein which are removed (destroyed) by drilling in step 36. The automated drilling and installation of permanent fasteners may be accomplished robotically by means of the conventional automated drilling and assembly system. With all permanent fasteners installed in the total number of holes required to join skin to the orbital splices and the longitudinal stringers, the required collars may then be installed manually in step 38 to complete the installation process.

The techniques described herein above have focused on the assembly of orbital splices and longitudinal stringers to fuselage skin. However, the techniques may likewise be employed to join other structural components to one another, for example, to join wing skin to wing ribs.

Therefore, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope thereof.

What is claimed is:

1. A process for joining parts together comprising:
   (i) positioning and temporarily clamping parts to be joined together;
   (ii) drilling a number (n) of pilot holes through the temporarily clamped parts, wherein the number (n) of pilot holes is less than a total number (N) of holes required to be drilled to allow the parts to be joined together by permanent fasteners;
   (iii) installing temporary fasteners in the number (n) of pilot holes;
   (iv) drilling a remaining number ($\eta$) of holes that are required in addition to the number (n) of pilot holes to achieve the total number (N) of holes required for the parts to be joined together by permanent fasteners; and
   (v) installing permanent fasteners in the number (n) of pilot holes and the remaining number ($\eta$) of holes drilled in step (iv) to thereby permanently join the parts together, wherein
   step (v) includes removing the temporary fasteners installed in the number (n) of pilot holes by drilling and thereafter installing permanent fasteners therein.

2. The process according to claim 1, wherein the temporary fasteners comprise tack rivets.

3. The process according to claim 1, wherein step (i) includes clamping the parts together with Cleco fasteners.

4. The process according to claim 1, wherein steps (iv) and (v) are practiced using an automated robotic drilling and assembly system.

5. The process according to claim 1, wherein step (ii) is practiced manually.

6. A process for joining parts together comprising:
   (i) positioning and temporarily clamping parts to be joined together;

(ii) drilling a number (n) of pilot holes through the temporarily clamped parts, wherein the number (n) of pilot holes is less than a total number (N) of holes required to be drilled to allow the parts to be joined together by permanent fasteners;

(iii) installing temporary fasteners in the number (n) of pilot holes;

(iv) drilling a remaining number ($\eta$) of holes that are required in addition to the number (n) of pilot holes to achieve the total number (N) of holes required for the parts to be joined together by permanent fasteners; and (v) installing permanent fasteners in the number (n) of pilot holes and the remaining number ($\eta$) of holes drilled in step (iv) to thereby permanently join the parts together, wherein step (ii) further comprises:

(iia) removing the temporarily clamped parts from one another after the number (n) of pilot holes is drilled therein; and (iib) cleaning the parts of burrs and/or metal filings.

7. The process according to claim 6, wherein step (iii) comprises reposition the cleaned parts so as to align the number (n) of pilot holes.

8. The process according to claim 1 or 6, wherein one of the parts is an aircraft fuselage support structure comprised of orbital splices and longitudinal stringers and another of the parts is an aircraft fuselage skin, and wherein step (i) comprises:

(ia) positioning the orbital splices and longitudinal stringers onto the aircraft fuselage skin; and (ib) temporarily clamping the orbital splices and longitudinal stringers to the aircraft fuselage skin.

9. The process according to claim 6, wherein the temporary fasteners comprise tack rivets.

10. The process according to claim 6, wherein step (i) includes clamping the parts together with Cleco fasteners.

11. The process according to claim 6, wherein steps (iv) and (v) are practiced using an automated robotic drilling and assembly system.

12. The process according to claim 6, wherein step (ii) is practiced manually.

* * * * *